(12) United States Patent
Nishita et al.

(10) Patent No.: US 12,181,282 B2
(45) Date of Patent: Dec. 31, 2024

(54) INFORMATION PROJECTING SYSTEM AND INFORMATION PROJECTING METHOD

(71) Applicant: TOPCON CORPORATION, Tokyo (JP)

(72) Inventors: Nobuyuki Nishita, Tokyo (JP); Junki Kaneko, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 236 days.

(21) Appl. No.: 17/854,991

(22) Filed: Jun. 30, 2022

(65) Prior Publication Data

US 2023/0019423 A1    Jan. 19, 2023

(30) Foreign Application Priority Data

Jul. 14, 2021  (JP) .................................. 2021-116744

(51) Int. Cl.
*G01C 15/02* (2006.01)
*G01C 15/00* (2006.01)

(52) U.S. Cl.
CPC ........... *G01C 15/02* (2013.01); *G01C 15/008* (2013.01)

(58) Field of Classification Search
CPC .... G01C 15/02; G01C 15/008; G01C 15/002; G01C 15/14; G01C 11/02; G01C 11/30; G01S 17/66; G01S 17/42; G01S 17/86; G01S 17/87; G01S 17/89; G01S 7/4808; G01S 17/06; G06K 9/6202; G06F 3/04845; G06T 19/20; B64C 39/024; G01B 21/22

USPC ........................... 356/601–623, 5.02, 139.01
See application file for complete search history.

(56) References Cited

U.S. PATENT DOCUMENTS

| | | | | |
|---|---|---|---|---|
| 3,765,766 A | * | 10/1973 | McConnell | G01C 15/002 244/17.11 |
| 6,023,326 A | * | 2/2000 | Katayama | G01C 15/002 33/290 |
| 11,460,299 B2 | * | 10/2022 | Nishita | G01C 11/02 |
| 2017/0252918 A1 | | 9/2017 | Nishita | |
| 2018/0347980 A1 | * | 12/2018 | Kotzur | G01C 15/008 |
| 2023/0097350 A1 | * | 3/2023 | Nishita | G01B 11/306 356/4.01 |

FOREIGN PATENT DOCUMENTS

GB            2269233 A  *  2/1994

* cited by examiner

*Primary Examiner* — Hoa Q Pham
(74) *Attorney, Agent, or Firm* — Studebaker & Brackett PC

(57) ABSTRACT

Provided is a technology to properly display information onto a projection surface without depending on a distance image sensor, and directly project a wide range of information other than a survey setting point onto a construction site. A system includes: a projector including an inclination sensor and at least one reflector; a measuring device configured to measure a position of the reflector; a means having surface information; and a means configured for setting a distance between a projection surface onto which the surface information is projected and the measuring device in a normal direction, wherein the measuring device measures the reflector, and the surface information adjusted according to the distance in the normal direction is projected onto the projection surface.

12 Claims, 17 Drawing Sheets

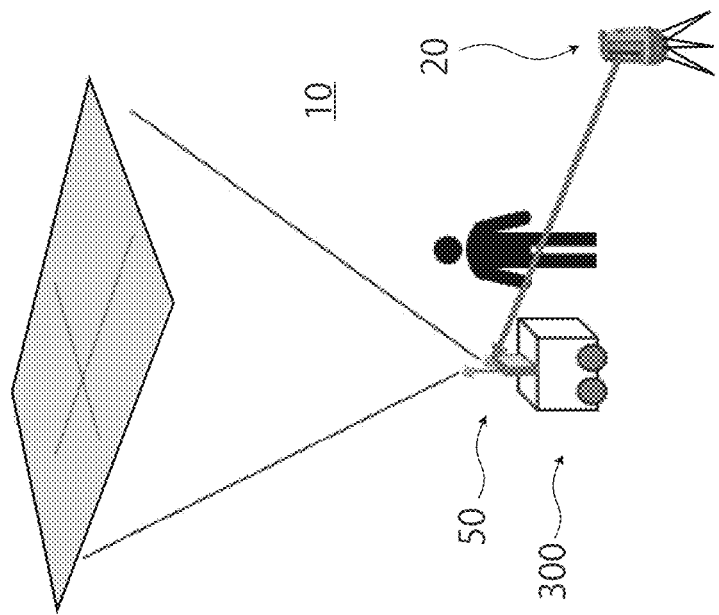
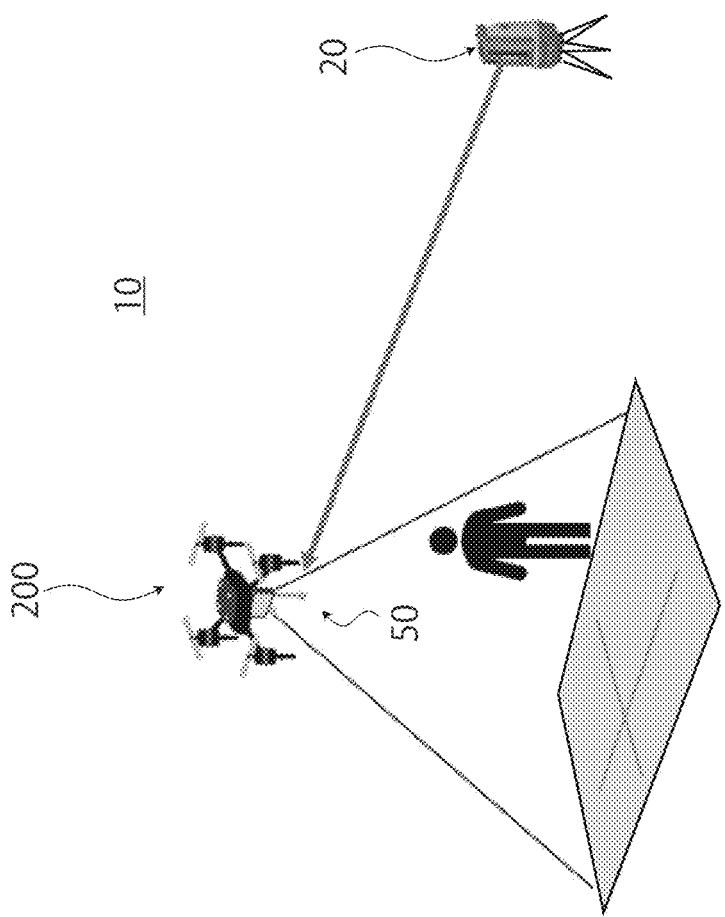
FIG. 14

Pattern 1
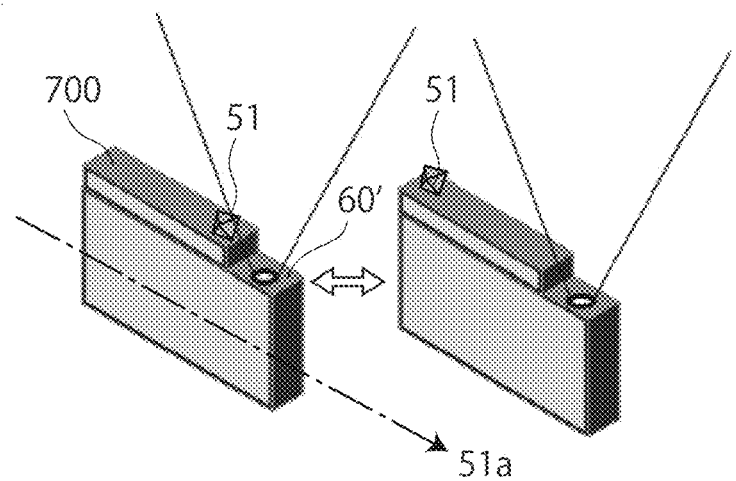
Pattern 2
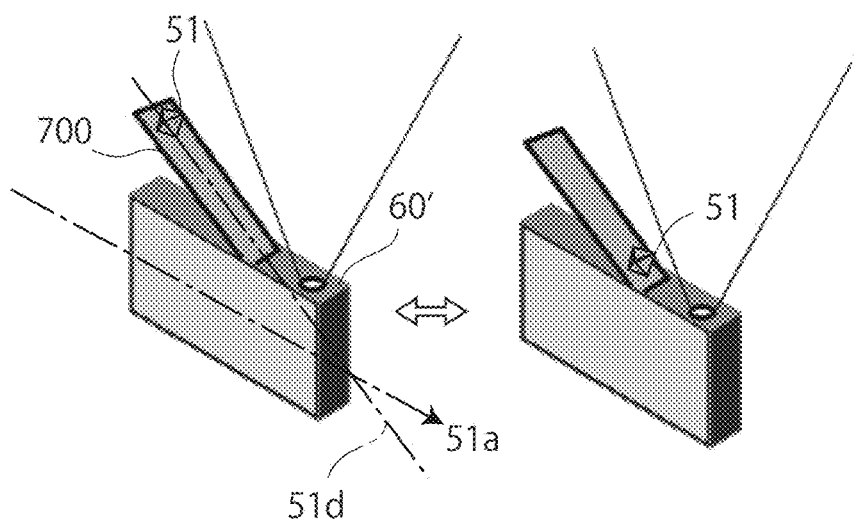
Pattern 3
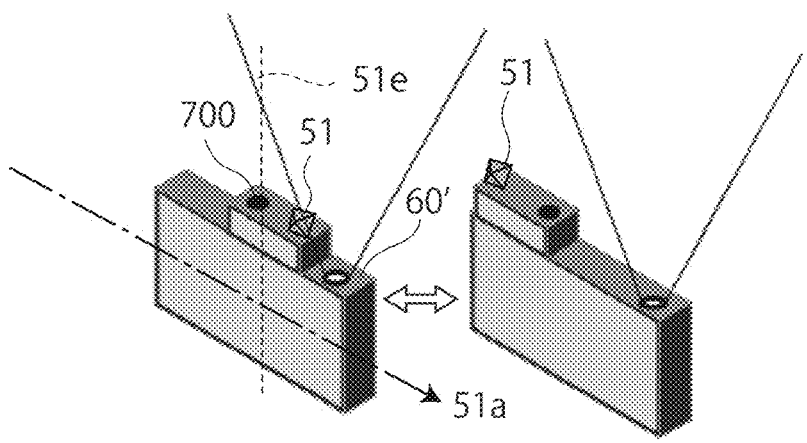
FIG. 17

INFORMATION PROJECTING SYSTEM AND INFORMATION PROJECTING METHOD

SUMMARY OF THE INVENTION

Technical Problem

The technology disclosed in Patent Literature 1 has the advantage that it eliminates an error caused by irregularities of a projection surface, however, it requires a "distance image sensor." In addition, in the technology disclosed in Patent Literature 1, an image of a survey setting point is projected, however, projection of various types of information other than the survey setting point is not considered.

The present invention was made in view of the circumstances described above, and an object thereof is to provide a technology to properly display information on a projection surface without depending on a distance image sensor, and directly project various types of information other than a survey setting point onto a construction site.

Solution to Problem

In order to achieve the object described above, a system according to an aspect of the present invention includes: a projector including an inclination sensor and at least one reflector; a measuring device including an inclination sensor and configured to measure a position of the reflector; a means having surface information; and a means configured for setting a distance between a projection surface onto which the surface information is projected and the measuring device in a normal direction, wherein the measuring device measures the reflector, and the surface information adjusted according to the distance in the normal direction is projected onto the projection surface.

Here, the projector only has to project (display) surface information on the projection surface.

The inclination sensor provided on the projector detects acceleration along at least one axis related to the projector. Preferably, the inclination sensor may detect acceleration along two orthogonal axes or, more preferably, three orthogonal axes related to the projector. The inclination sensor is not limited to an acceleration sensor, and may be other sensors such as a liquid level tilt sensor.

The reflector provided on the projector is preferably a 360° prism, but may be other reflectors such as a reflection seal, etc., as long as it is capable of reflecting distance-measuring light and tracking light from the measuring device.

The measuring device only has to be capable of measuring a distance and angles (a horizontal angle and a vertical angle) from the measuring device (instrument center) to the reflector, and measuring three-dimensional coordinates of the reflector (reflector coordinate information).

Basic data of surface information includes position information of a survey setting point, position information of piping and electric equipment in a road or building, and component attaching position information, etc., based on design data of BIM (Building Information Modeling), etc. Basic data of surface information includes, in addition to these position information for construction, a wide range of information relating to a construction site, such as irregularities data obtained by a 3D scanner, deterioration diagnostic data obtained by a deterioration diagnostic application, data obtained by visualizing information like a heat map, etc. The basic data of surface information may be configured as data that is prepared in advance to be read and used, or may be configured as basic data that is acquired in real time by using various devices (a 3D scanner, application, analyzing device, etc.) and is used. The means having surface information generates the surface information to be projected onto the projection surface based on these basic data.

The projection surface includes a ceiling, a floor, and a wall, etc., at the construction site. The projection surface is preferably a horizontal plane, but may be a shape that is horizontal but is not plane, for example, an inclined surface or a surface with irregularities as long as three-dimensional shape information on the inclination or irregularities, of the projection surface can be grasped in advance from the basic data.

There are various methods as the means for setting a distance between the projection surface onto which the surface information is projected and the measuring device in a normal direction, so the methods will be described later.

Effect of the Invention

According to the present invention, information can be properly displayed on a projection surface without depending on a distance image sensor. In addition, a technology to directly project a wide range of information other than a survey setting point onto a construction site can be provided.

Description

BRIEF DESCRIPTION OF THE DRAWINGS

FIG. 14 is a configuration view of an information projecting system according to Modification 4 of the embodiment.

FIG. 17 is a configuration view of a projector device of the information projecting system according to Modification 6 of the embodiment.

DESCRIPTION OF EMBODIMENTS

Hereinafter, preferred embodiments of the present invention will be described with reference to the drawings, however, the present invention is not limited to these. In the respective embodiments, the same components are provided with the same reference signs, and overlapping description will be omitted as appropriate.

1. First Embodiment 1-1. Information Projecting System

Figure 1:
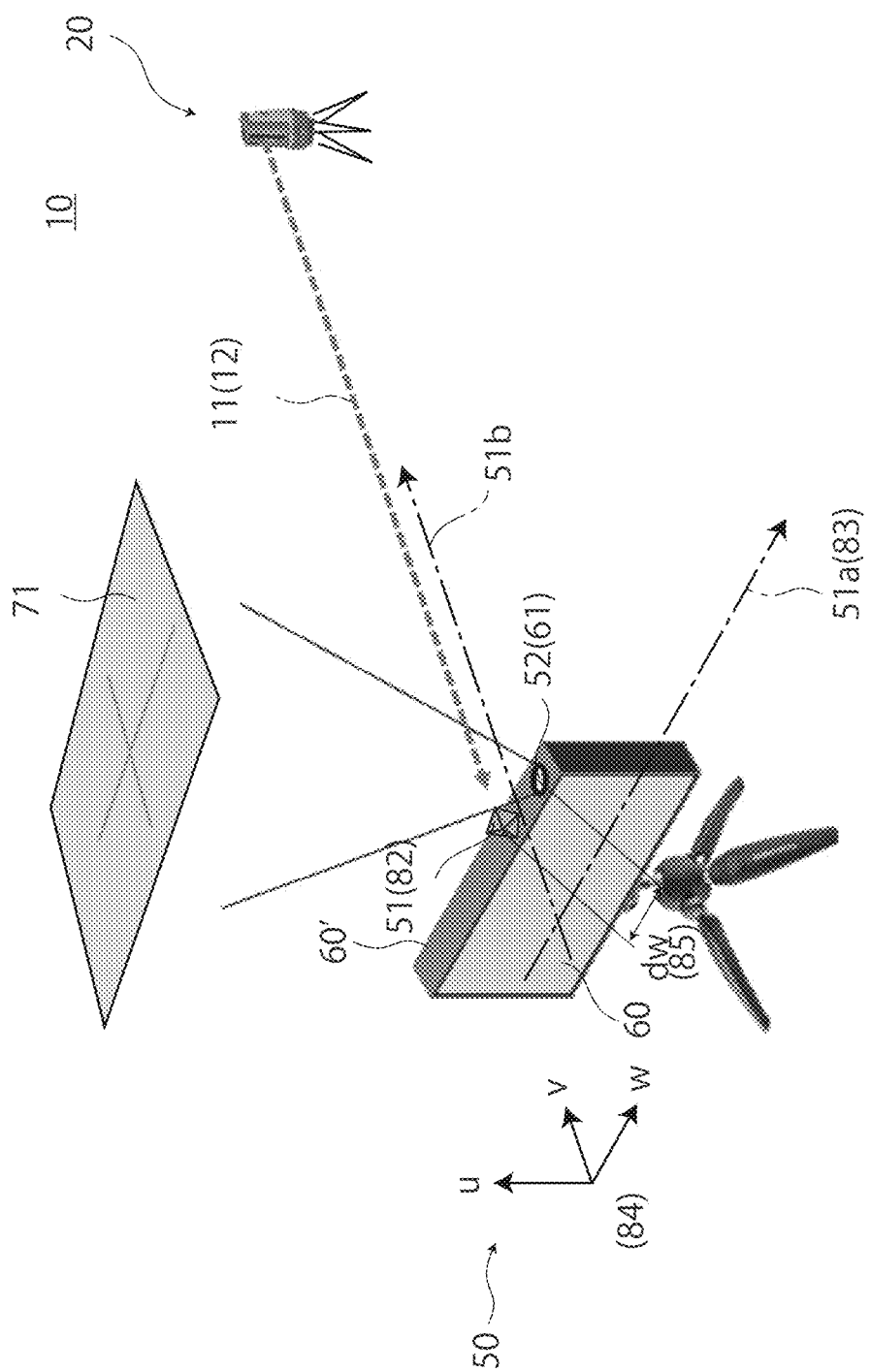
FIG. 1 is a view illustrating a configuration of an information projecting system according to a first embodiment.
Figure 2:
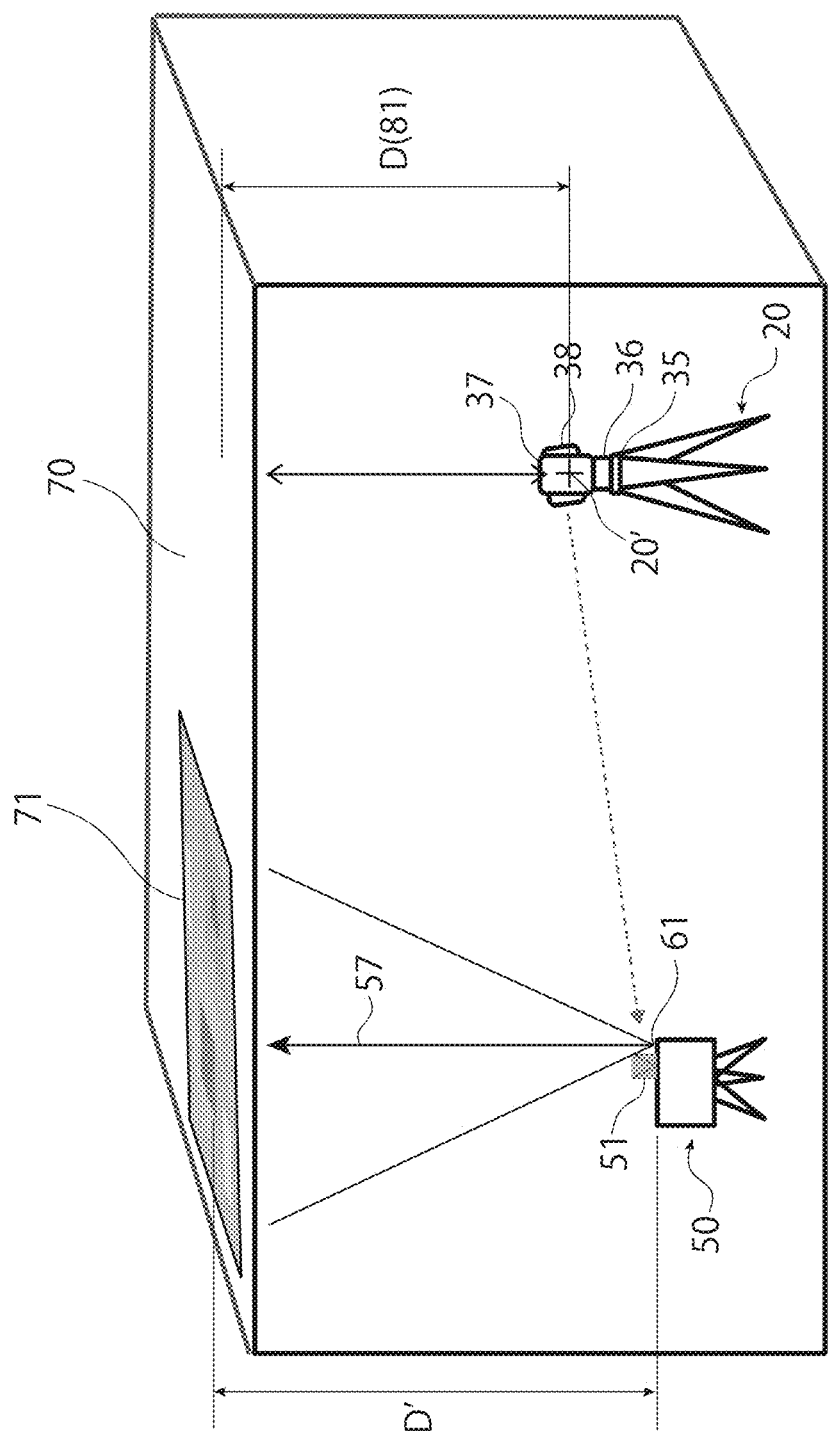
FIG. 2 is a view describing a usage pattern of the same information projecting system at a construction site.
Figure 3:
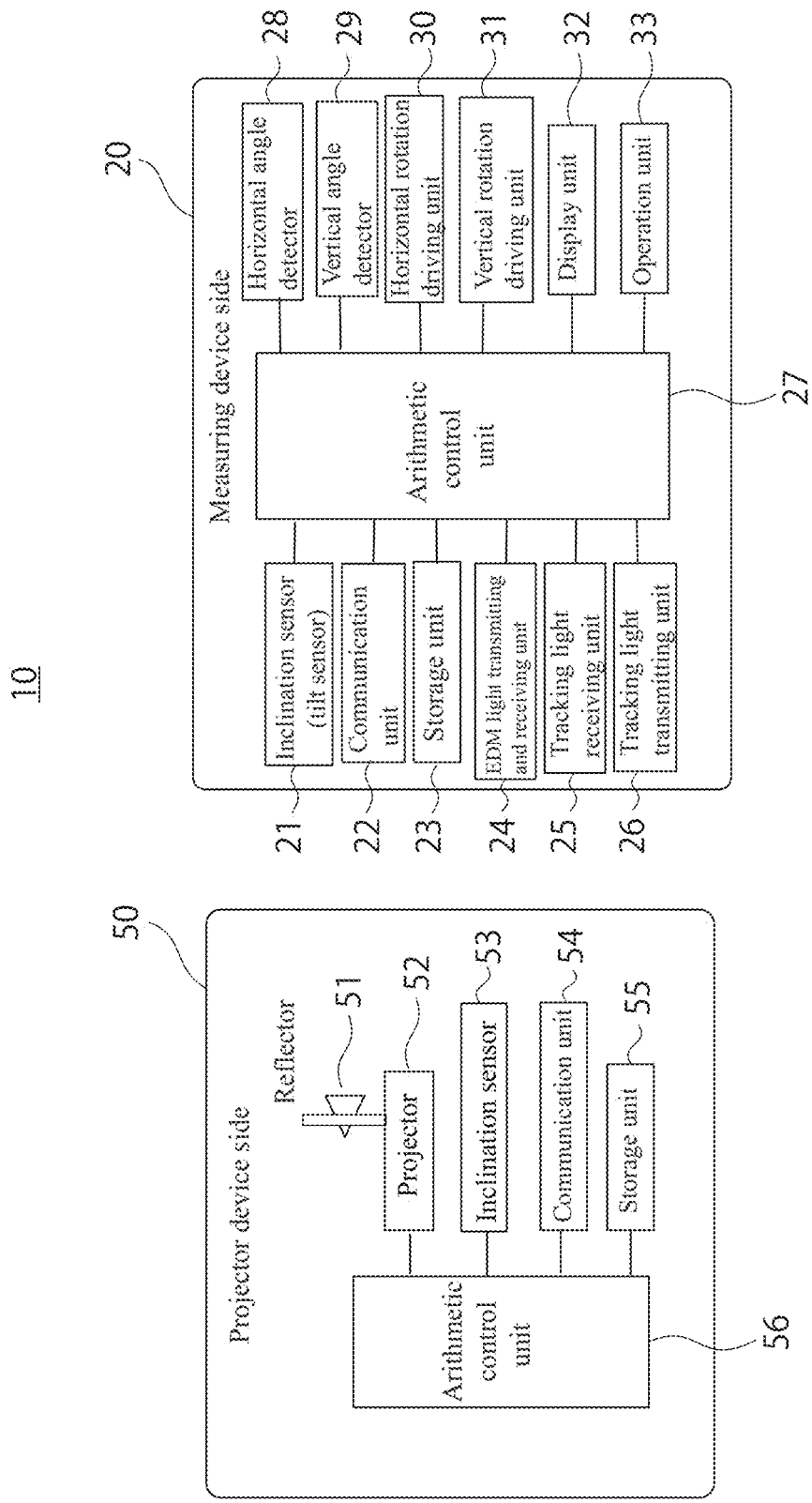
FIG. 3 is a configuration block diagram of the same information projecting system.

FIG. 1 is a view illustrating a configuration of an information projecting system according to a first embodiment, FIG. 2 is a view describing a usage pattern of the same information projecting system at a construction site, and FIG. 3 is a configuration block diagram of the same information projecting system.

An information projecting system 10 of the present embodiment includes a measuring device 20 and a projector device 50. In the present embodiment, each of the measuring device 20 and the projector device 50 is located at a construction site by using a tripod, etc., however, the measuring device 20 and the projector device 50 may be located on a tripod or carriage with wheels or may be handheld by an operator as long as they remain stationary at the time of a measurement (distance measurement). In the present embodiment, the construction site is a closed space with a ceiling, a floor, and a wall as illustrated in FIG. 2, however, the construction site is not limited to this.

1-2. Measuring Device

The measuring device 20 only has to measure a distance and angles (a horizontal angle and a vertical angle) from the measuring device (instrument center 20': FIG. 2) to a reflector 51 described later. Preferably, the measuring device is a total station, and is installed at a known point at the construction site and emits distance-measuring light 11 (pulsed laser beam: FIG. 1) toward the reflector 51, receives reflected light (pulsed reflected light) of the distance-measuring light 11 from the reflector 51, makes a distance measurement for each pulse, and averages distance-measuring results to make a high-accuracy distance measurement. Alternatively, a phase difference measuring method using a light beam modulated at a predetermined frequency may be employed, or another method may be employed, and the measuring device is not limited to the present embodiment.

When the measuring device 20 is a total station, it includes a leveling unit 35, a base portion 36, a bracket portion 37, and a telescope portion 38 (FIG. 2). In addition, the measuring device includes an inclination sensor 21, a communication unit 22, a storage unit 23, an EDM light transmitting and receiving unit 24, a tracking light receiving unit 25, a tracking light transmitting unit 26, an arithmetic control unit 27, a horizontal angle detector 28, a vertical angle detector 29, a horizontal rotation driving unit 30, a vertical rotation driving unit 31, a display unit 32, and an operation unit 33 (FIG. 3).

The leveling unit 35 is a portion to be mounted on a tripod. The inclination sensor (tilt sensor) 21 is provided in the leveling unit 35, and is one of the means for setting a distance (D in FIG. 2) between a projection surface 70 (FIG. 2) onto which surface information is projected and the measuring device 20 (instrument center 20') in a normal direction of the projection surface 70, and detects acceleration along at least one axis (the vertical direction in the example in FIG. 2) related to the measuring device 20. Preferably, the inclination sensor detects acceleration along two orthogonal axes including the one axis, more preferably, three orthogonal axes including the one axis related to the measuring device 20. There are various methods for setting the distance D, and they will be described later.

The inclination sensor 21 detects an inclination of the measuring device 20 (telescope portion 38). The inclination sensor 21 is provided in the leveling unit 35 in the present embodiment, and detects an inclination of the measuring device 20 (telescope portion 38) by detecting an inclination of the leveling unit 35 to a horizontal plane. The inclination sensor 21 may be provided in, for example, the bracket portion 37 or another portion as long as it detects an inclination of the measuring device 20 (telescope portion 38), and is not limited to the configuration of the present embodiment.

The base portion 36 is provided so that its inclination angle to the leveling unit 35 is variable. On the base portion 36, the bracket portion 37 rotatable in the horizontal direction around a vertical axial center is provided. In the bracket portion 37, the telescope portion 38 is provided rotatably in the vertical direction around a horizontal axial center. On the bracket portion 37, the display unit 32 and the operation unit 33 are provided. The bracket portion 37 is driven by the horizontal rotation driving unit 30, and the telescope portion 38 is driven by the vertical rotation driving unit 31. The driving units 30 and 31 are, for example, motors. A horizontal rotation angle of the bracket portion 37 is detected by the horizontal angle detector 28, and a vertical rotation angle of the telescope portion 38 is detected by the vertical angle detector 29. The angle detectors 28 and 29 are, for example, encoders.

In the telescope portion 38, a telescope optical system, the EDM light transmitting and receiving unit 24, the tracking light receiving unit 25, and the tracking light transmitting unit 26 are incorporated, and in the bracket portion 37, the arithmetic control unit 27, the communication unit 22, and the storage unit 23 of the measuring device side are incorporated.

The EDM light transmitting and receiving unit 24 emits distance-measuring light 11 (FIG. 1) in a direction of a collimation optical axis of the telescope. The arithmetic control unit 27 described later measures a distance from the instrument center 20' (FIG. 2) to the reflector 51 by receiving reflected light of the distance-measuring light 11 from the reflector 51. The tracking light transmitting unit 26 emits tracking light 12 (FIG. 1) whose optical axis is matched with that of the distance-measuring light 11. The tracking light receiving unit 25 includes an image sensor (for example, a CCD sensor or a CMOS sensor), and can identify local coordinates of each pixel in an orthogonal coordinate system having an origin set at a sensor camera center. The arithmetic control unit 27 described later identifies a position of the tracking light 12 from a difference between a landscape image including the tracking light 12 reflected by the reflector 51 and a landscape image excluding the tracking light 12 by the tracking light receiving unit 25 and the tracking light transmitting unit 26. Hereinafter, the tracking light transmitting unit 26 and the tracking light receiving unit 25 are collectively referred to as tracking units.

The communication unit 22 enables communication between an arithmetic control unit 56 (refer to FIG. 3) of the projector side and the arithmetic control unit 27 of the measuring device side through a communication unit 54 (refer to FIG. 3) of the projector side, and wireless communication is made possible.

To the arithmetic control unit 27, the inclination sensor 21, the communication unit 22, the storage unit 23, the EDM light transmitting and receiving unit 24, the tracking light receiving unit 25, the tracking light transmitting unit 26, the arithmetic control unit 27, the horizontal angle detector 28, the vertical angle detector 29, the horizontal rotation driving unit 30, the vertical rotation driving unit 31, the display unit 32, and the operation unit 33 are connected. The arithmetic control unit 27 controls the overall operation of the measuring device 20 according to a program stored in the storage unit 23.

The arithmetic control unit 27 can direct the telescope portion 38 toward a predetermined direction and scan a predetermined range by properly rotating the bracket portion 37 and the telescope portion 38 by controlling driving of the horizontal rotation driving unit 30 and the vertical rotation driving unit 31. The arithmetic control unit 27 can measure a distance (distance measurement) to the reflector 51 by controlling the EDM light transmitting and receiving unit 24. At this time, by measuring (calculating) an angle of site and a horizontal angle of a collimation direction of the telescope, the arithmetic control unit 27 can acquire "reflector coordinate information 82 (three-dimensional coordinate position in an absolute coordinate system)" of the reflector 51.

The arithmetic control unit 27 can cause the telescope portion 38 to always face (track) the reflector 51 by controlling driving of the driving units 30 and 31 based on information from the tracking units 25 and 26. Therefore, in the measuring device 20, the leveling unit 35, the base portion 36, the bracket portion 37, the telescope portion 38, the EDM light transmitting and receiving unit 24, the tracking light receiving unit 25, the tracking light transmitting unit 26, the horizontal rotation driving unit 30, the horizontal angle detector 28, the vertical rotation driving unit 31, the vertical angle detector 29, and the inclination sensor 21 function as a survey unit that is driven and controlled by the arithmetic control unit 27.

1-3. Projector Device

The projector device 50 projects surface information 71 (refer to FIGS. 1 and 2) onto a projection surface 70 (refer to FIG. 2). The projector device 50 includes the reflector 51, a projector 52, an inclination sensor 53, the communication unit 54, a storage unit 55, and the arithmetic control unit 56 (FIG. 3). The projector device 50 includes a housing 60 having a box shape as a whole, and has a projection start point 61 of the projector 52 and one reflector 51 on one surface 60' of the housing (FIG. 1). In the present embodiment, the surface 60' is located to face upward so that the surface information 71 is projected onto the ceiling of the construction site, however, the surface 60' may be located to face downward so that the surface information is projected onto the floor, or may be located to face sideways so that the surface information is projected onto the wall.

The reflector 51 is preferably an all-around prism that can reflect light along its incident direction regardless of which direction of the entire circumference (360°) the light (distance-measuring light 11 or tracking light 12) is made incident from, however, any reflector may be used.

In the present embodiment in which the reflector 51 is one in number, a direction 51b for knowing "projector orientation information 83 (reference direction 51a in FIG. 1)" is set. The reference direction 51a is a direction set for the housing 60 for detecting a direction of a projection optical axis 57 (refer to FIG. 2) of the housing 60 (projector device 50), and for example, in the example illustrated in FIG. 1, for knowing a longitudinal direction of the surface 60' on which the reflector 51 and the projection start point 61 are placed as the reference direction 51a, a configuration is made so that the reference direction 51a can be relatively identified based on a direction 51b in which a surface orthogonal to the surface 60' directly faces the measuring device 20.

The inclination sensor 53 detects "projector inclination information 84." In the present embodiment, the inclination sensor 53 is configured by a triaxial acceleration sensor that can detect acceleration in three directions of three axes of u, v, and w axes (refer to FIG. 1) orthogonal to each other set in the projector device 50, and is provided by being fixed to the housing 60. Therefore, the inclination sensor 53 acquires "projector inclination information 84" by detecting an inclination of the projector device 50 by using a horizontal or vertical direction as a reference by detecting an inclination of the housing 60 with respect to the horizontality. In the present embodiment, one axis (for example, u-axis) among the detectable three axes of the inclination sensor 53 is matched with the projection optical axis 57 of the projector 52.

The projector 52 projects surface information 71 onto a predetermined range (projection range) centered on the projection optical axis 57 (refer to FIG. 2) (refer to FIGS. 1 and 2). Here, the projector 52 projects an image onto the predetermined range centered on the projection optical axis 57, so that a portion constituting a surface crossing the projection optical axis 57 is a projection surface 70 (refer to FIG. 2, etc.). In the present embodiment, the projector 52 is configured so that three light sources configured to emit lights in three colors of R, G, and B can emit lights on the same light path, and a two-dimensional deflecting mirror is provided on the light path. By properly driving each light source and the two-dimensional deflecting mirror under control of the arithmetic control unit 56, the projector 52 projects an arbitrary image onto the projection surface 70 in the predetermined range centered on the projection optical axis 57. The projector 52 only has to project an arbitrary image onto the projection surface 70, and is not limited to the configuration of the present embodiment. In the projector 52, the predetermined range (projection range) onto which an image is projected, that is, an image to be projected is rectangular (refer to FIGS. 1 and 2), however, the shape of this range (projection image) maybe set as appropriate, and is not limited to the present embodiment.

Here, the reflector 51 and the projector 52 are fixed to the housing 60, so that their positional relationship on the housing 60 is fixed. That is, a separation distance and a separation direction between a reflection center (not illustrated) of the reflector 51 and the projection start point 61 (FIG. 1) of the projector 52 are fixed, and by setting in advance the separation direction based on the three axes of the inclination sensor 53 or the reference direction 51a, coordinate information of the projection start point 61 of the projector 52 can be relatively identified from "reflector coordinate information 82" of the reflector 51. Therefore, by acquiring relative direction information ("housing positional relationship information 85") between the reflector 51 and the projector 52 with respect to the separation distance and the separation direction, a position of the projection start point 61 can be identified from the reflector 51 by offset observation (for example, in FIG. 1, it can be identified that the projector 52 (projection start point 61) is located at a position moved by a distance dw in the w-axis direction from the position of the reflector 51). The offset observation in the present embodiment obtains coordinate information of a target position by moving known coordinate information of the reflector, etc., by software operation. The housing positional relationship information 85 between the reflector 51 and the projector 52 is measured and stored in advance in the storage unit 55, and is transmitted as necessary based on the request of a projection image generating unit 100 described later.

The communication unit 54 enables communication with the arithmetic control unit 27 (refer to FIG. 2) of the measuring device side through the communication unit 22 of the measuring device 20, and wireless communication is made possible.

To the arithmetic control unit 56, the projector 52, the inclination sensor 53, the communication unit 54, and the storage unit 55 are connected. The arithmetic control unit 56 controls the overall operation of the projector device 50 according to a program stored in the storage unit 55.

Here, either the arithmetic control unit 27 of the measuring device side or the arithmetic control unit 56 of the projector side includes the projection image generating unit 100 (refer to FIG. 11 described later). This projection image generating unit 100 is configured by electronic circuits such as a CPU (Central Processing Unit), an ASIC (Application Specific Integrated Circuit), and a PLD (Programmable Logic Device) such as an FPGA (Field Programmable Gate Array). The projection image generating unit 100 may be provided in either of the measuring device 20 and the projector device 50 as long as the projection image generating unit can transmit and receive information to and from these devices by communication, or may be provided in a separate arithmetic processing device. Therefore, the projection image generating unit is not illustrated in FIG. 3.

The projection image generating unit 100 collects (i) "distance information 81" concerning a distance D between the projection surface and the measuring device, (ii) "reflector coordinate information 82" of the reflector 51, (iii) "projector orientation information 83," (iv) "projector inclination information 84," and (v) "housing positional relationship information 85" between the reflector 51 and the projector 52. From the information (i) to (v), the projection image generating unit 100 obtains a distance (referred to as projection distance D') from the projection start point 61 of the projector device 50 to the projection surface 70, and generates a projection image (surface information 71) whose actual dimensions are matched with the projection surface 70 at the projection surface by considering the projection distance D' and the direction of the projection optical axis 57. This will be described with reference to the flowchart in FIG. 4.

1-4. Information Projecting Method

Figure 4:
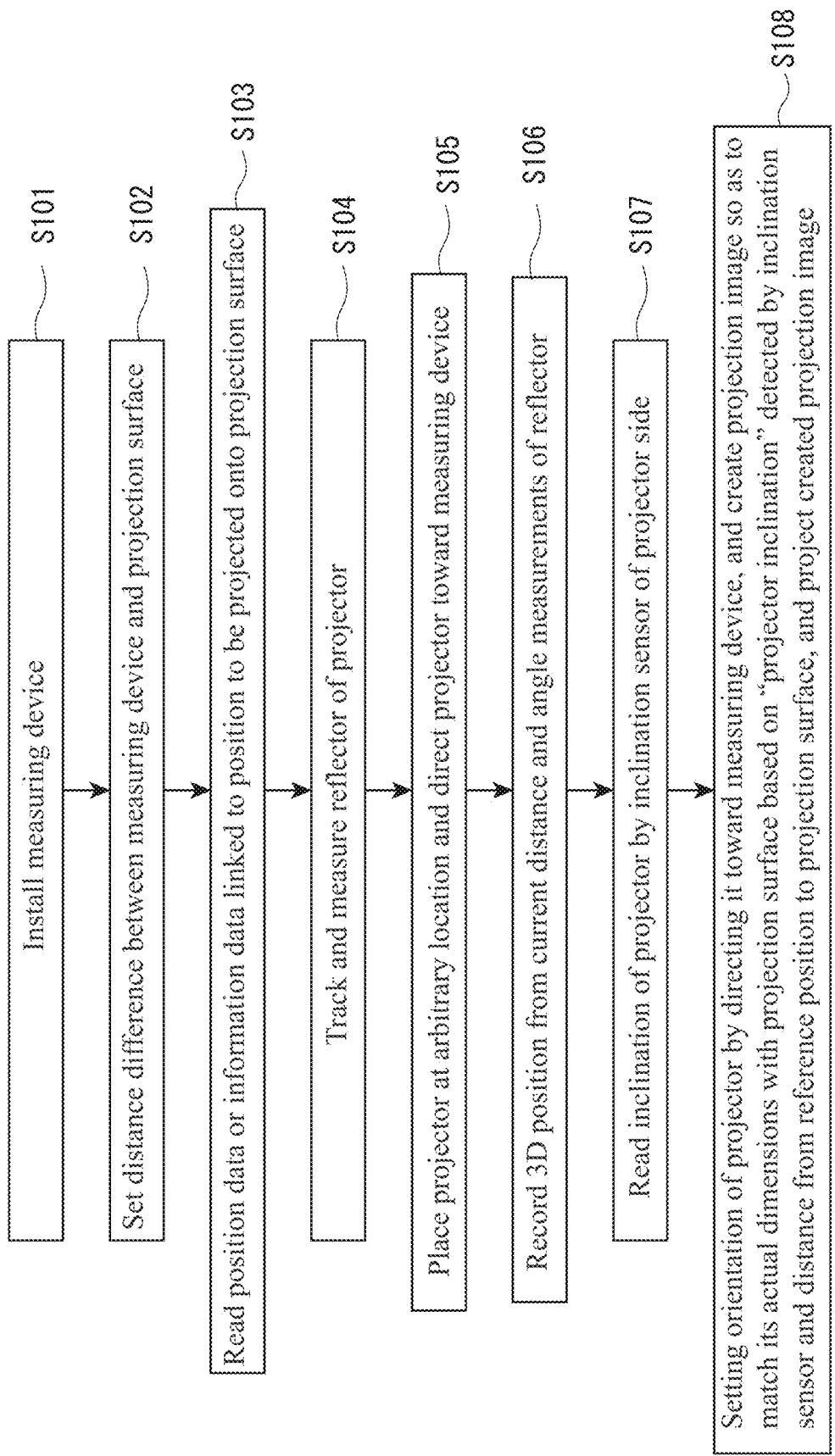
FIG. 4 is a flowchart illustrating an information projecting method according to the first embodiment.

FIG. 4 is a flowchart illustrating an information projecting method according to the first embodiment.

In Step S101, an operator installs the measuring device 20 at a construction site. Installation of the measuring device 20 includes an installation work at a position whose coordinates are determined with respect to design data (design drawing), and the measuring device 20 is fixed to a known point on the design drawing by using a tripod, etc.

In Step S102, a distance D (FIG. 2) between the measuring device 20 and the projection surface 70 is set ("distance information 81" is acquired) by the measuring device 20. Setting of the distance D is a work to grasp where the instrument center 20' of the measuring device 20 is with respect to the projection surface 70. When the measuring device 20 includes the inclination sensor 21, an instrument height is known, so that, for example, when the instrument height is 1 m in comparison with a ceiling height of 3 m of the construction site from the design data, the distance D between the projection surface and the measuring device can be calculated to be 2 m. Alternatively, the distance D between the projection surface and the measuring device may be calculated by backward intersection accompanying the coordinate determination in Step S101, or it is also possible that another reflector (not illustrated) is located on the projection surface 70 and this reflector is measured with the measuring device 20, and by offset observation by offsetting the reflector size from coordinate information of the reflector, from a distance from the instrument center 20' to the projection surface 70, the distance is calculated.

In Step S103, basic data of the surface information 71 to be projected onto the projection surface 70 is read into the projection image generating unit 100 from design data, etc. This step only has to be performed before the start of projection.

In Step S104, the measuring device 20 starts to track the reflector 51 of the projector device 50.

In Step S105, the operator locates the projector device 50 at an arbitrary position so as to cause the direction 51b (FIG. 1) of the projector device 50 to directly face the measuring device 20 so that the reference direction 51a can be identified. Accordingly, the projection image generating unit 100 can identify the "projector orientation information 83."

In Step S106, the measuring device 20 acquires "reflector coordinate information 82" of the reflector 51 by measuring a distance and angles to the reflector 51, and stores the information in the storage unit 23, and transmits the information to the projection image generating unit 100.

In Step S107, the inclination sensor 53 of the projector side acquires "projector inclination information 84" by reading inclinations of the u, v, and w axes of the projector device 50, and transmits the information to the projection image generating unit 100.

In the above description, in the projection image generating unit 100, (i) "distance information 81 (Step S101)" concerning a distance D between the projection surface and the measuring device, (ii) "reflector coordinate information 82 (Step S106)" of the reflector 51, (iii) "projector orientation information 83 (Step S105)," (iv) "projector inclination information 84 (Step S107)," and (v) "housing positional relationship information 85 (read from the storage unit 55)" between the reflector 51 and the projector 52, are collected.

In Step S107, the projection image generating unit 100 can identify the direction of the projection optical axis 57 (FIG. 2) in the projector device 50 from the projector orientation information 83 and the projector inclination information 84, and from the reflector coordinate information 82, the projector inclination information 84, and the housing positional relationship information 85, the projection image generating unit can identify absolute coordinates of the projection start point 61 by offset observation from the reflector 51. Also, the projection image generating unit 100 can identify the projection distance D' from the projection start point 61 of the projector to the projection surface 70 from the distance information 81 concerning the distance D between the projection surface and the measuring device and the coordinate information of the reference position (the reflector 51 or the projection start point 61) of the projector device 50. From the projection distance D' (FIG. 2) and the direction of the projection optical axis 57 (FIG. 2), the projection image generating unit 100 can generate a projection image (surface information 71) whose actual dimensions are matched with the projection surface 70. The projection image generating unit 100 projects the generated surface information 71 onto the projection surface 70 through the projector 52.

1-5. Operation and Effect

According to the present embodiment, various types of information including not only a survey setting point can be directly projected onto a ceiling, a floor, etc., of a construction site. In addition, according to the present embodiment, various information can be projected onto the construction site without a distance image sensor. In the present embodiment, a distance image sensor is not included, so that the information projecting system can be configured at low cost.

2. Second Embodiment 2-1. Information Projecting System

Figure 5:
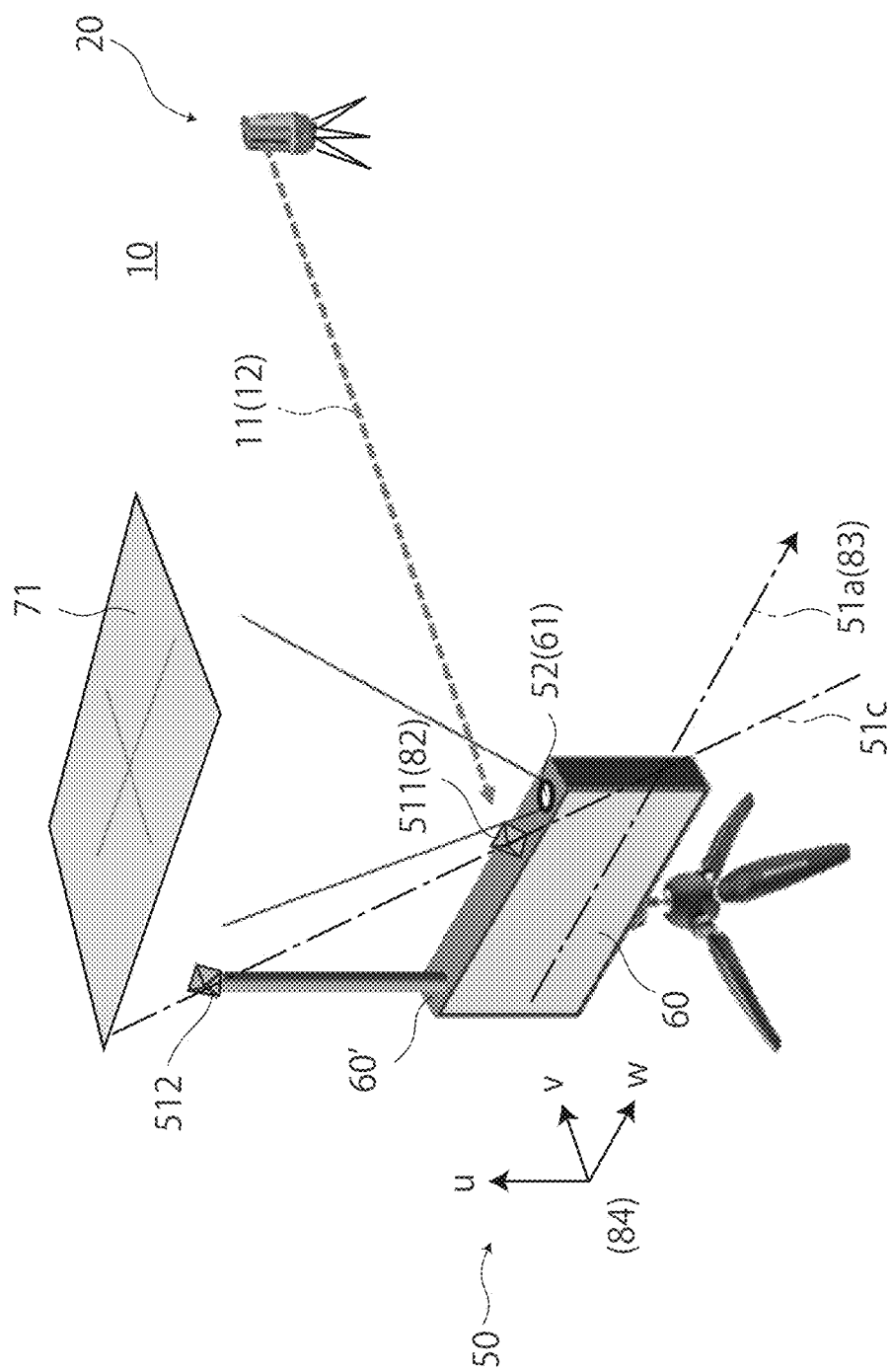
FIG. 5 is a view illustrating a configuration of an information projecting system according to a second embodiment.
Figure 6:
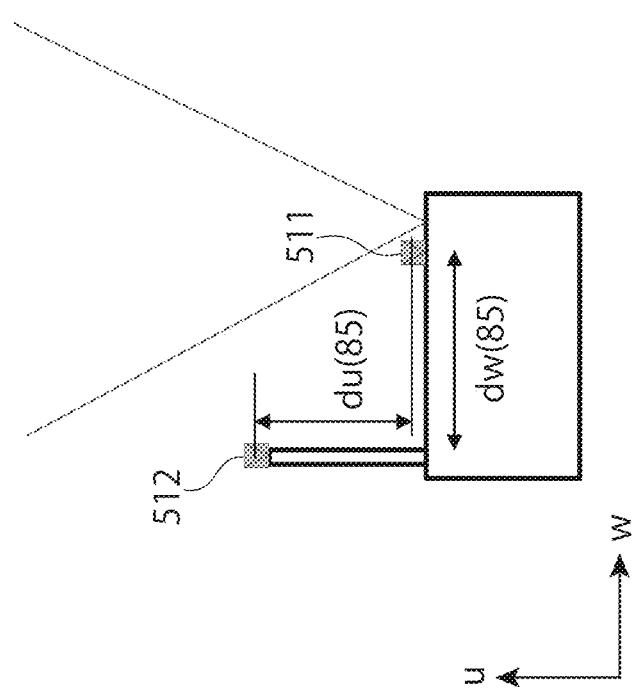
FIG. 6 is a view describing a configuration of a projector device of the same information projecting system.
Figure 7:
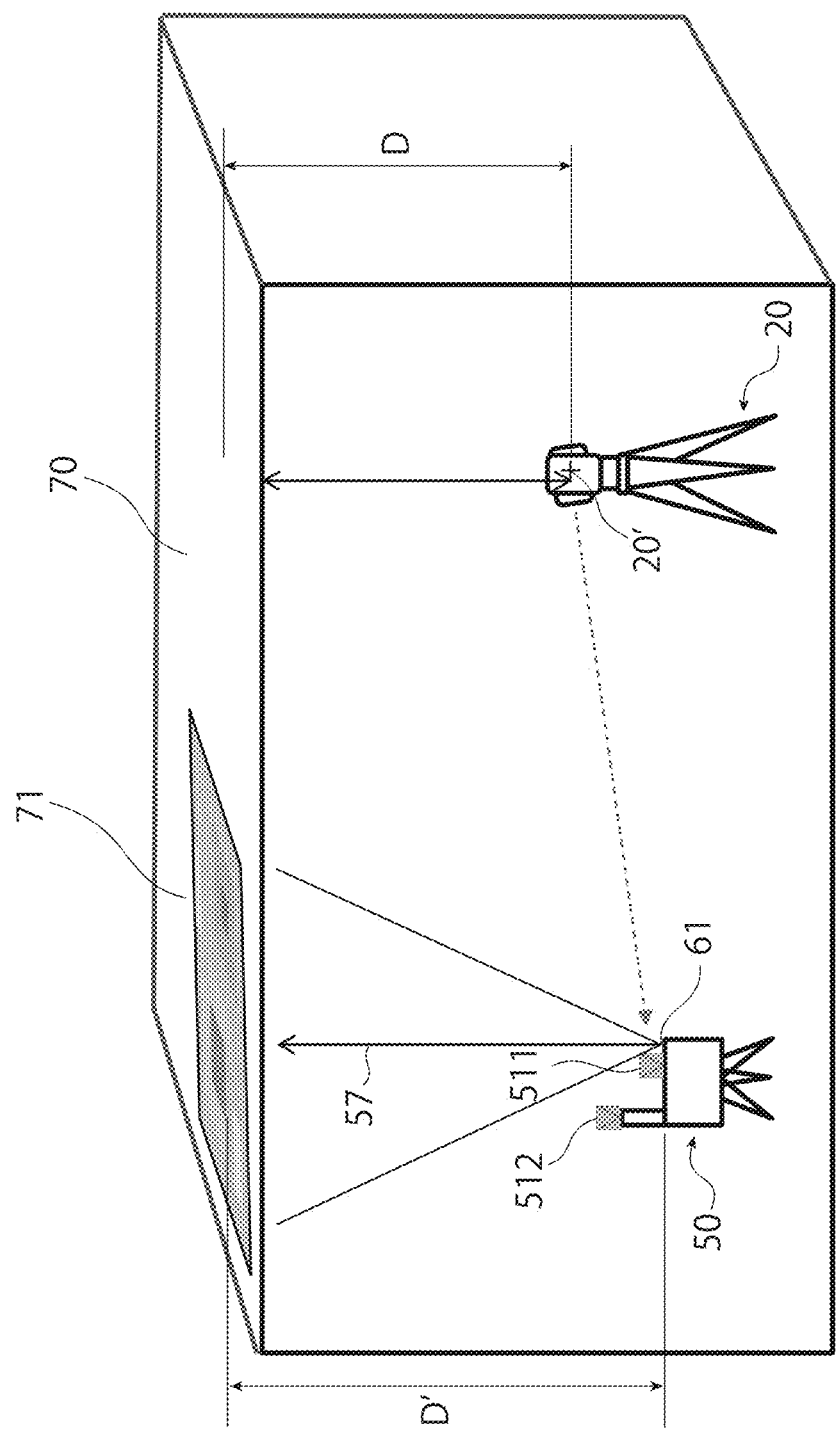
FIG. 7 is a view describing a usage pattern of the same information projecting system at a construction site.

FIG. 5 is a view illustrating a configuration of an information projecting system according to a second embodiment, FIG. 6 is a view describing a configuration of a projector device of the same information projecting system, and FIG. 7 is a view describing a usage pattern of the same information projecting system at a construction site. As a configuration block diagram of the information projecting system according to the second embodiment, FIG. 3 is quoted.

An information projecting system 10 of the present embodiment also includes a measuring device 20 and a projector device 50. The configuration of the measuring device 20 is the same as that in the first embodiment. On the other hand, the projector device 50 includes two reflectors, that is, a first reflector 511 and a second reflector 512. The reflectors 511 and 512 are also preferably all-around prisms, however, they may be any reflectors.

As illustrated in FIG. 6, the first reflector 511 and the second reflector 512 are located by providing offsets du and dw to any two axes (in the present embodiment, the u-axis (vertical direction) and the w-axis (horizontal direction)) among three axes of the u, v, and w axes to be grasped by the inclination sensor 53. In the present embodiment, providing the offset du (difference in the vertical direction) to the u-axis enables the measuring device 20 to distinguish between the first reflector 511 and the second reflector 512, and providing the offset dw (difference in the horizontal direction) to the w-axis makes known the reference direction 51*a*, that is, the "projector orientation information 83" by using a line 51*c* connecting the first reflector 511 and the second reflector 512 as a reference.

2-2. Information Projecting Method

Figure 8:
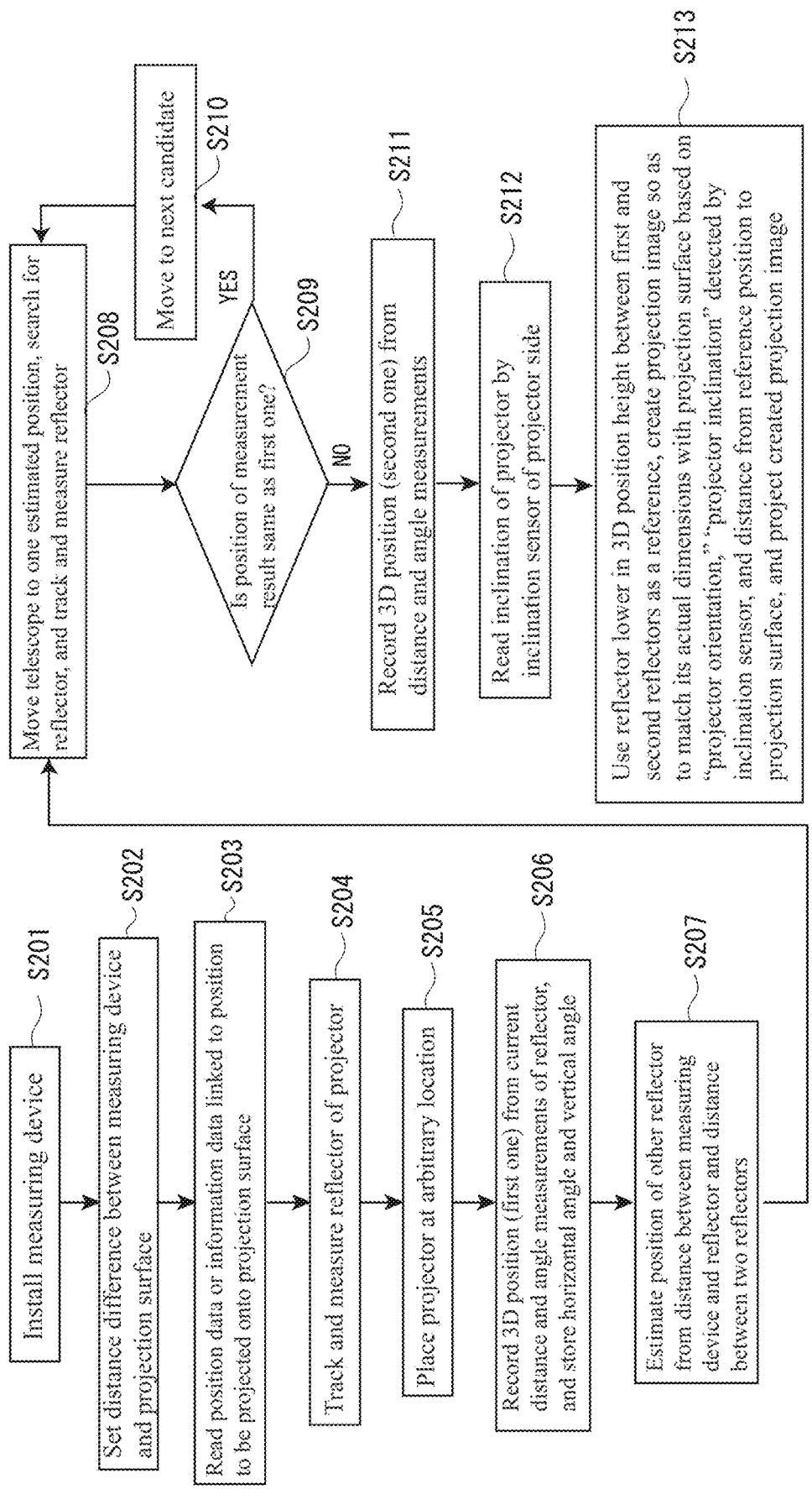
FIG. 8 is a flowchart illustrating an information projecting method according to the second embodiment.

FIG. 8 is a flowchart of an information projecting method according to the second embodiment. Steps S201 to S204 are respectively the same as Steps S101 to S104.

In Step S205, an operator locates the projector device 50 at an arbitrary position. This is because, in the present embodiment, the projector orientation information 83 can be automatically identified by the projection image generating unit 100 by tracking the first reflector 511 and the second reflector 512 in the subsequent Steps S206 to S211.

In Step S206, the measuring device 20 locks on to and measures a distance and angles to either the first reflector 511 or the second reflector 512 (measures the first one. The first one may be either the first reflector or the second reflector). The measuring device 20 stores "reflector coordinate information 82" of the first one in the storage unit 23, and transmits it to the projection image generating unit 100.

In Step S207, the projection image generating unit 100 estimates a position of the second one of the reflectors in terms of a distance between the measuring device 20 and the reflector coordinate information 82 of the first one and an offset (slope distance) between the first reflector 511 and the second reflector 512.

Figure 9:
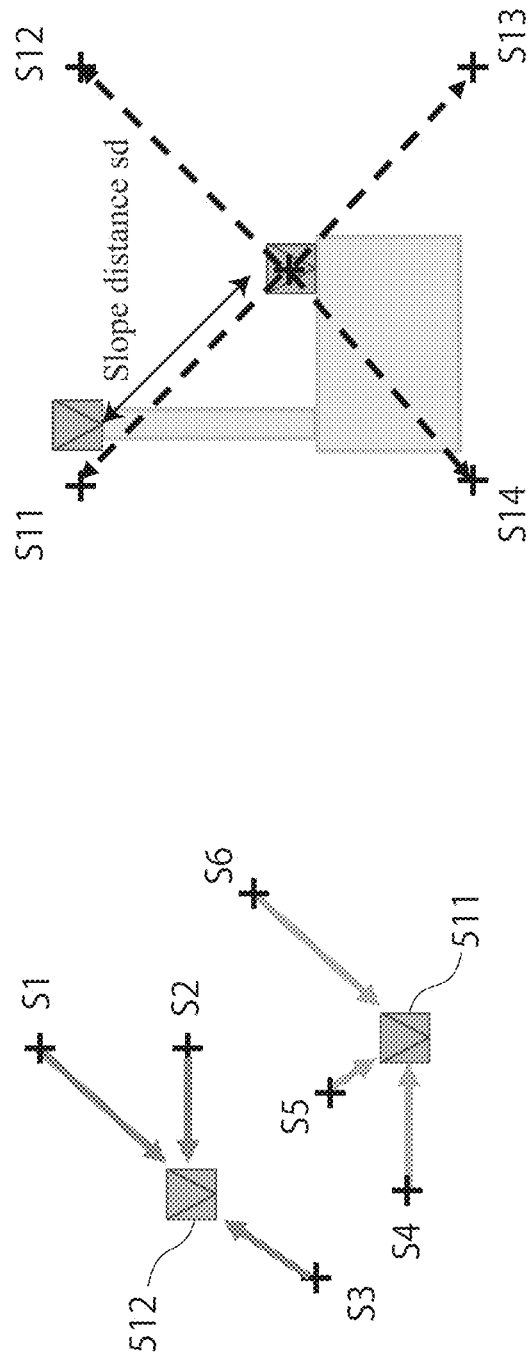
FIG. 9 is an image view of estimation of a position of a second one of reflectors according to the same information projecting method.

FIG. 9 is an image view of estimation of a position of the second one of the reflectors in Step S207. The tracking light receiving unit 25 detects both of the first reflector 511 and the second reflector 512. Here, which reflector the tracking light 12 locks on to depends on a search start point of the tracking light 12. For example, when a search start point of the tracking light 12 is S4, S5, or S6, the first reflector 511 is nearer than the second reflector 512, so that the tracking light 12 locks on to the first reflector 511. When the search start point of the tracking light 12 is S1, S2, or S3, the second reflector 512 is nearer than the first reflector 511, so that the tracking light 12 locks on to the second reflector 512. On the other hand, the EDM light transmitting and receiving unit 24 cannot identify which of the first reflector 511 and the second reflector 512 is locked on to and which reflector coordinate information 82 is measured. Therefore, after acquiring the reflector coordinate information 82 of the first one, from the reflector coordinate information 82 of the first one, the projection image generating unit 100 calculates a slope distance sd between the first reflector 511 and the second reflector 512 (they are not distinguished from each other) detected on the image of the image sensor, calculates four search start points S11, S12, S13, and S14 separated diagonally by the slope distance sd or more from the reflector coordinate information 82 of the first one, and transmits position information of the search start points S11, S12, S13, and S14 to the measuring device 20.

In Step S208, the measuring device 20 selects one position among the search start points S11, S12, S13, and S14, moves the collimation optical axis of the telescope portion 38 to this position, and starts tracking.

In Step S209, the measuring device 20 measures a distance and angles to the tracked second one of the reflectors, and transmits reflector coordinate information 82 of the second one to the projection image generating unit 100. The projection image generating unit 100 determines whether the reflector coordinate information 82 of the second one is the same as the reflector coordinate information 82 of the first one.

When the coordinate information is the same, the same reflector as the first one is locked on to at the search start point selected in Step S208, and this means that it has failed to lock on to the second one of the reflectors. Therefore, the process shifts to Step S210, and tracking of the next search start point among the four candidates is started. On the other hand, when the coordinate information is not the same, by the change to the search start point selected in Step S208, the second one of the reflectors, not the same as the first one of the reflectors, has been successfully locked on to. Therefore, the process shifts to Step S211, and the measuring device 20 stores reflector coordinate information 82 of the second one in the storage unit 23, and transmits it to the projection image generating unit 100.

In Step S212, as in Step S107, the inclination sensor 53 of the projector side acquires "projector inclination information 84" by reading inclinations on the u, v, and w axes of the projector, and transmits the information to the projection image generating unit 100.

In the above description, in the projection image generating unit 100, (i) "distance information 81 (Step S201)" concerning a distance D between the projection surface and the measuring device, (ii) "reflector coordinate information 82 (Step S206 or S211)" of the reflector used as a reference (the reflector with smaller coordinates. In the present embodiment, the first reflector 511 lower in height), (iii) "projector orientation information 83 (reference direction 51a identified by using a line 51c connecting the first reflector 511 and the second reflector 512 as a reference)," (iv) "projector inclination information (Step S212)," and (v) "housing positional relationship information 85 (read from the storage unit 55)" between the reflector 51 and the projector 52, are collected.

In Step S213, as in Step S107, the projection image generating unit 100 can identify a direction of the projection optical axis 57 (FIG. 7) in the projector device 50 from the projector orientation information 83 and the projector inclination information 84, and can identify absolute coordinates of the projection start point 61 by offset observation from the reflector 511 as a reference from the reflector coordinate information 82, the projector inclination information 84, and the housing positional relationship information 85. Then, the projection image generating unit 100 can identify a projection distance D' from the projection start point 61 of the projector to the projection surface 70 from the distance information 81 concerning the distance D between the projection surface and the measuring device and coordinate information of the reference position (reflector 511 or projection start point 61) of the projector device 50. From the projection distance D' (FIG. 7) and the direction of the projection optical axis 57 (FIG. 7), the projection image generating unit 100 can generate a projection image (surface information 71) whose actual dimensions are matched with the projection surface 70. The projection image generating unit 100 projects the generated surface information 71 onto the projection surface 70 through the projector 52.

Figure 10:
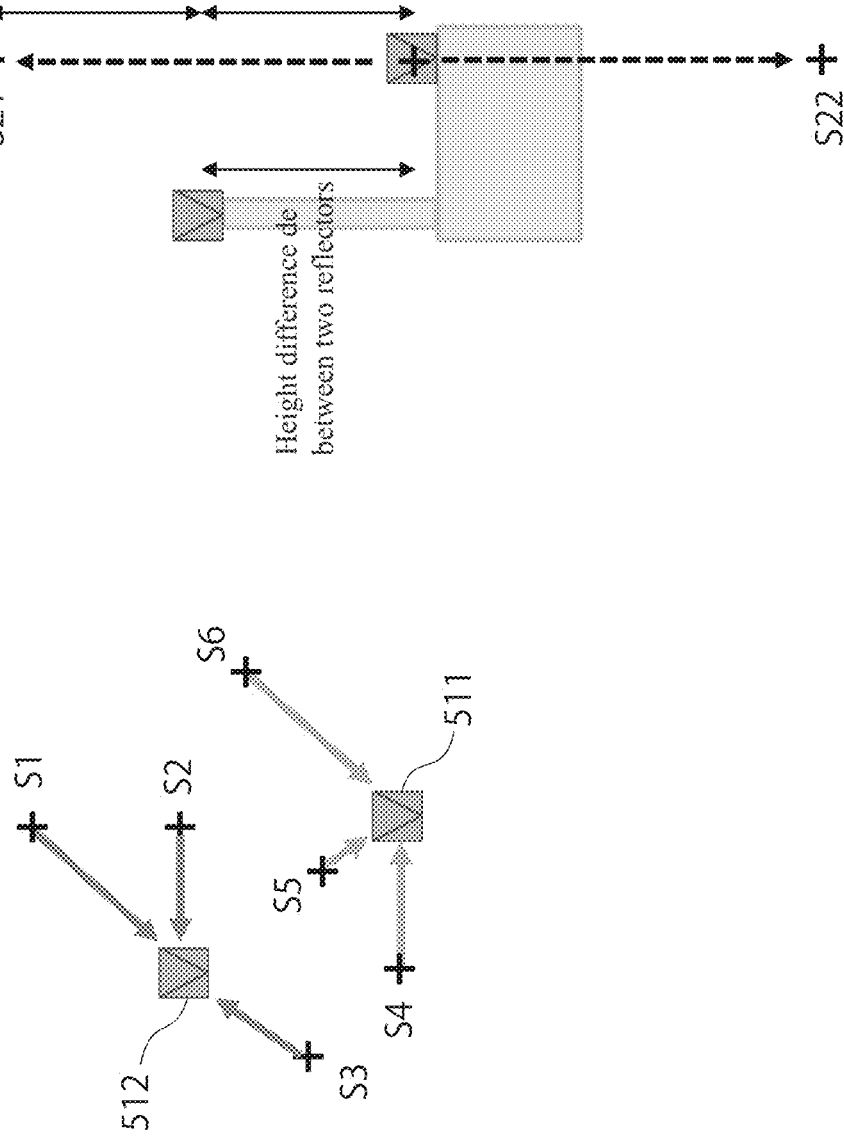
FIG. 10 is an image view of another estimation of a position of a second one of reflectors according to the same information projecting method.

In Steps S206 to S211, concerning estimation of a position of the second one of the reflectors, estimation in four directions is illustrated in FIG. 9, and it is also possible that the position estimation is performed by estimation in two directions as illustrated in FIG. 10. FIG. 10 is an image view of another estimation of a position of the second one of the reflectors in Step S207. As described above, when the search start point of the tracking light 12 is S1, S2, or S3, the second reflector 512 is nearer than the first reflector 511, so that the tracking light 12 locks on to the second reflector 512, however, the EDM light transmitting and receiving unit 24 cannot identify which of the first reflector 511 and the second reflector 512 the tracking light 12 has locked on to as the first one of the reflectors. Therefore, after acquiring reflector coordinate information 82 of the first one, from the reflector coordinate information 82 of the first one, the projection image generating unit 100 calculates a height difference de between the first reflector 511 and the second reflector 512 (they are not distinguished from each other) detected on the image of the image sensor, calculates two search start points S21 and S22 separated upward and downward by a distance twice or more of the height difference de from the reflector coordinate information 82 of the first one, and transmits position information of the search start points S21 and S22 to the measuring device 20. In Step S208, the measuring device 20 selects either the search start point S21 or S22, moves the collimation optical axis of the telescope portion 38 to this position, and starts tracking. In Step S209, the measuring device 20 measures a distance and angles to the tracked second one of the reflectors, and transmits reflector coordinate information 82 of the second one to the projection image generating unit 100. The projection image generating unit 100 determines whether the reflector coordinate information 82 of the second one is the same as the reflector coordinate information 82 of the first one. When the coordinate information is the same, the same reflector as the first one is locked on to at the search start point selected in Step S208, so that the process shifts to Step S210. On the other hand, when the coordinate information is not the same, by the change to the search start point selected in Step S208, the second one of the reflectors has been successfully locked on to, so that the process shifts to Step S211. In the estimation illustrated in FIG. 10, the search start point candidates can be reduced to two points.

2-3. Operation and Effect

According to the present embodiment, in addition to the same effect as that of the first embodiment, in Step S205, the operator can locate the projector device 50 at an arbitrary position without any restriction such as the projector is caused to directly face the measuring device 20. That is, in the present embodiment, only by adding one reflector to the configuration of the first embodiment, the work efficiency of the operator can be improved.

3. Modifications

Preferred modifications applicable to the first embodiment and the second embodiment will be described.

3-1. Modification 1

Figure 11:
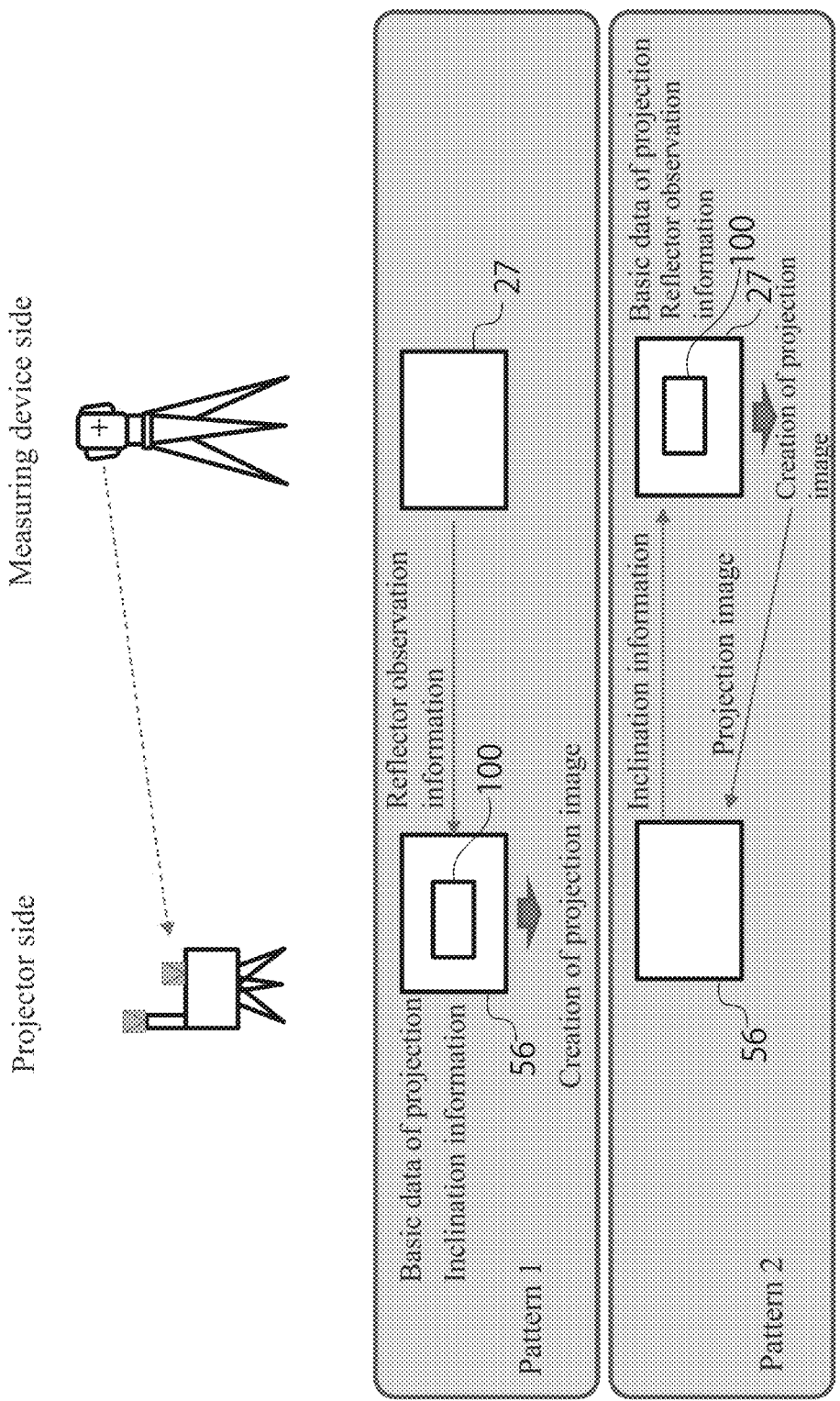
FIG. 11 is an image view related to information processing of a projection image generating unit of an information projecting system according to Modification 1 of the embodiment.

FIG. 11 is an image view related to information processing of a projection image generating unit 100 of an information projecting system 10 according to Modification 1 of the embodiment. In the above description, the projection image generating unit 100 may be provided in either the arithmetic control unit 27 of the measuring device side or the arithmetic control unit 56 of the projector side.

A pattern 1 in FIG. 11 illustrates a case where the arithmetic control unit 56 of the projector side includes the projection image generating unit 100. In the case of the pattern 1, the arithmetic control unit 27 of the measuring device side transmits reflector coordinate information 82 and distance information 81 (D in FIG. 2) to the projector device 50. The arithmetic control unit 56 of the projector side receives information from the measuring device 20, acquires basic data of the surface information 71 based on design data, etc., through the storage unit 55 or the communication unit 54, and by the projection image generating unit 100, generates a projection image (surface information 71) whose actual dimensions match the projection surface 70.

A pattern 2 in FIG. 11 illustrates a case where the arithmetic control unit 27 of the measuring device side includes the projection image generating unit 100. In the case of the pattern 2, the arithmetic control unit 56 of the projector side transmits projector inclination information 84 and housing positional relationship information 85 to the measuring device 20. The arithmetic control unit 27 of the measuring device side receives information from the projector device 50, acquires basic data of the surface information 71 based on design data through the storage unit 23 or the communication unit 22, and by the projection image generating unit 100, generates a projection image (surface information 71) whose actual dimensions match the projection surface 70, and transmits the projection image to the projector device 50. In the projector device 50, the projection image (surface information 71) that has been generated in the measuring device 20 and has actual dimensions matching the projection surface 70 is streamed by the projector 52.

3-2. Modification 2

Figure 12:
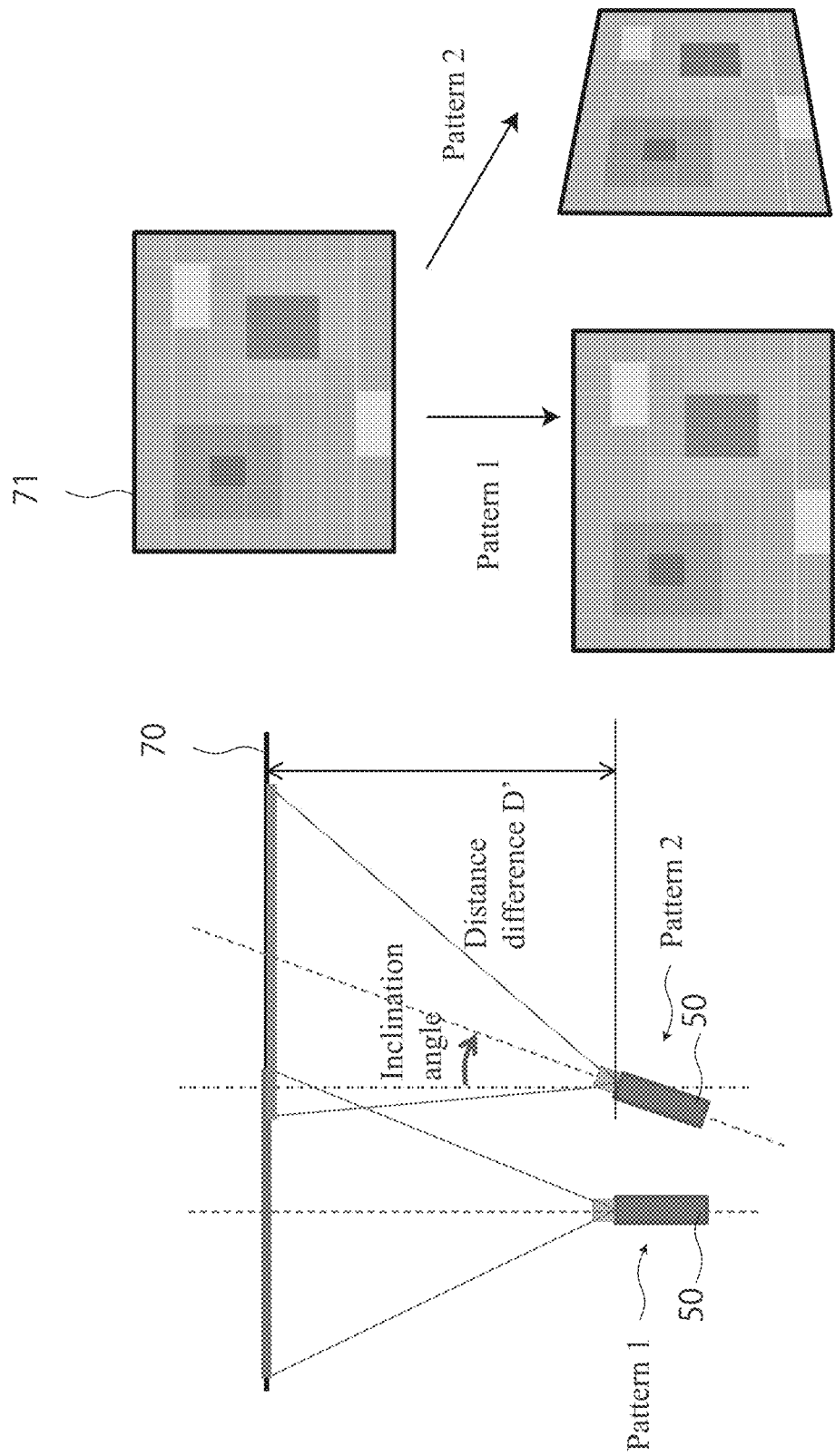
FIG. 12 is an image view related to information processing of a projection image generating unit of an information projecting system according to Modification 2 of the embodiment.

FIG. 12 is an image view related to information processing of a projection image generating unit 100 of an information projecting system 10 according to Modification 2 of the embodiment, and specifically, an image view of deformation correction of a projection image (surface information 71). In a pattern 1 in which a projection optical axis 57 of a projector device 50 is orthogonal to the projection surface 70, a projection image (surface information 71) whose actual dimensions match the projection surface 70 can be as generated by the projection image generating unit 100. On the other hand, in a case of a pattern 2 in which the projection optical axis 57 of the projector device 50 is not orthogonal but has an inclination angle to the projection surface 70, it is preferable that the projection image generating unit 100 corrects the generated surface information 71 to a projection image whose actual dimensions match the projection surface 70 by applying a known projection technology such as trapezoidal correction.

3-3. Modification 3

Figure 13:
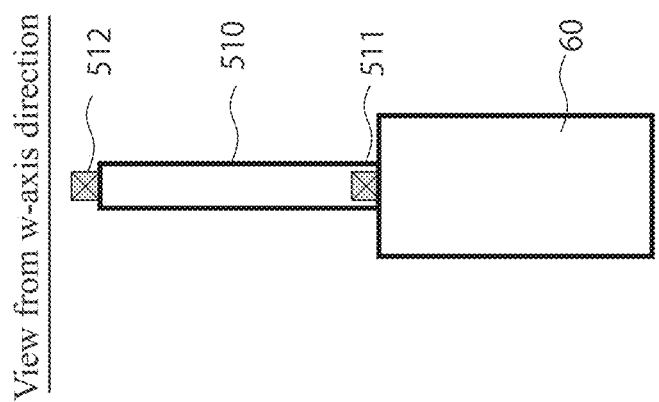
FIG. 13 is a configuration view of a projector device of an information projecting system according to Modification 3 of the embodiment.

FIG. 13 is a configuration view of a projector device of an information projecting system 10 according to Modification 3 of the embodiment, illustrating a modification that is preferably applied to the second embodiment (including two or more reflectors). A support body 510 of a second reflector 512 that is made different in height from the first reflector 511 used as a reference is preferably a columnar body that is hollow as viewed from the w-axis direction (FIG. 5, etc.). Accordingly, even when the first reflector 511 is positioned behind the support body 510 as viewed from the measuring device 20, distance-measuring light 11 (tracking light 12) of the measuring device 20 passes through the hollow of the support body 510 and captures the first reflector 511, so that a measurement can be made even when the first reflector 511 and the second reflector 512 are aligned in a straight line.

3-4. Modification 4

FIG. 14 is a configuration view of an information projecting system 10 according to Modification 4 of the embodiment. In a pattern 1, the information projecting system further includes an unmanned aircraft (hereinafter, referred to as UAV 200. UAV: Unmanned Air Vehicle) that can autonomously fly, and a projector device 50 is mounted on a lower surface of the UAV 200 in such a manner that a reflector is located on a lower surface. The measuring device 20 measures the reflector of the projector device 50 during hovering of the UAV 200. The combination with the UAV 200 is preferable for projection of the surface information 71 particularly onto a floor or wall. In a pattern 2, the information projecting system 10 further includes an autonomous running robot 300, and the projector device 50 is mounted on an upper surface of the autonomous running robot 300. The autonomous running robot 300 includes, for example, a dog-shaped type. The measuring device 20 measures the reflector of the projector device 50 during stoppage of autonomous running of the autonomous running robot 300. When the UAV 200 or the autonomous running robot 300 includes an image identification sensor and is configured to identify a position of an operator so that the projector device 50 follows the operator, it becomes unnecessary for the operator to locate the projector device 50.

3-5. Modification 5

Figure 15:
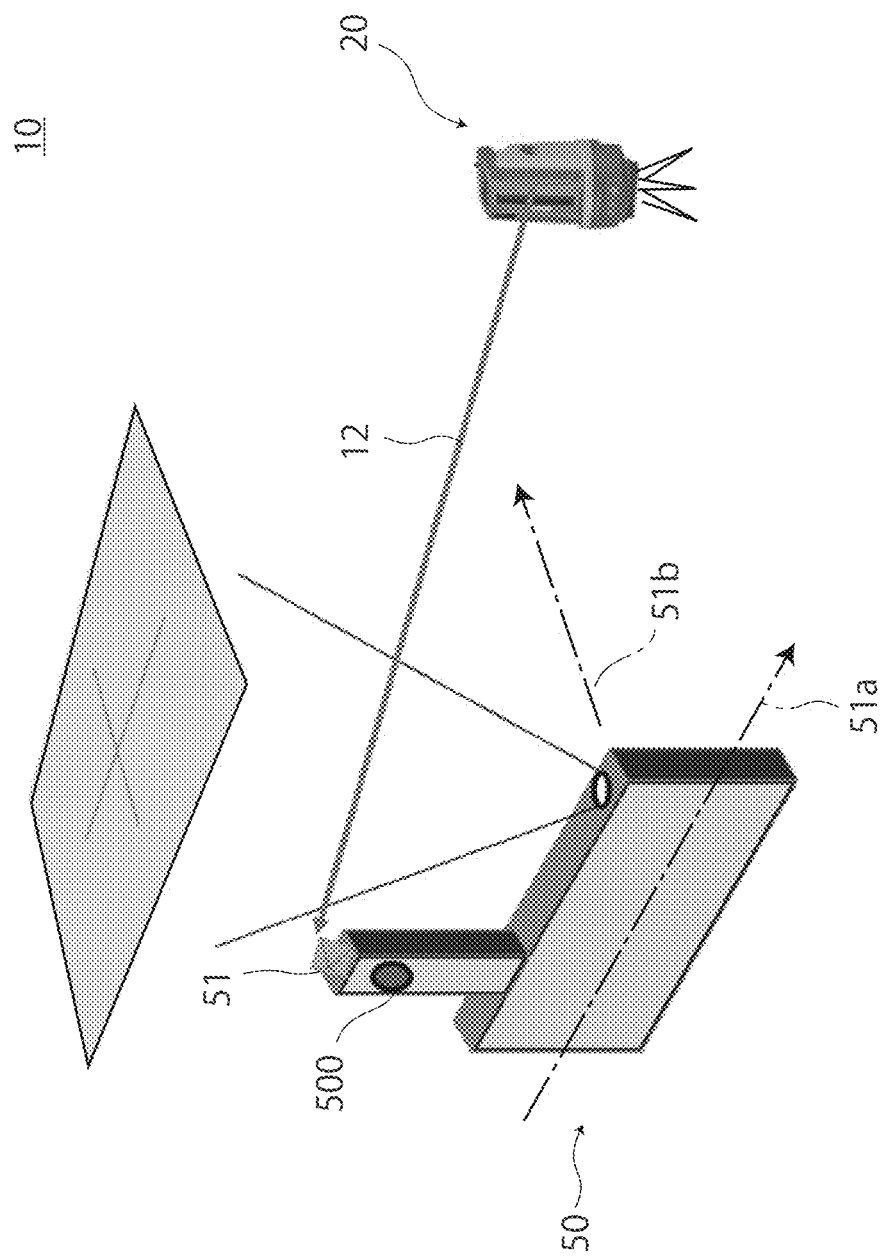
FIG. 15 is a configuration view of an information projecting system according to Modification 5 of the embodiment.

FIG. 15 is a configuration view of an information projecting system 10 according to Modification 5 of the embodiment. Modification 5 is a modification to be preferably applied to the first embodiment (including one reflector). A projector device 50 of the information projecting system 10 of Modification 5 includes a global camera 500, and a reflector 51 is located on a head portion of a housing that stores the global camera 500. Here, the global camera 500 is fixed to the housing 60, so that a positional relationship among the reflector 51, a projector 52, and the global camera 500 in the housing 60 is fixed, and respective housing positional relationship information 85 of these can be identified. In this Modification, the global camera 500 is a so-called 360-degree camera, and includes a first camera in a direction 51b directly facing the measuring device 20 and a second camera on the opposite side, and can image all directions at one time by synthesizing images of the respective cameras. However, the global camera may be a camera that images only on the directly facing direction 51b side. By including the camera in the projector device 50, the projection image generating unit 100 can obtain a horizontal angle and a vertical angle of the camera viewed from the measuring device 20 from a position of an image of the tracking light 12 in the camera image, and can identify a posture of the camera. Accordingly, even though the reflector is one in number, a camera posture, that is, a projector posture can be identified, so that projector orientation information 83 and projector inclination information 84 can be identified.

3-6. Modification 6

Figure 16:
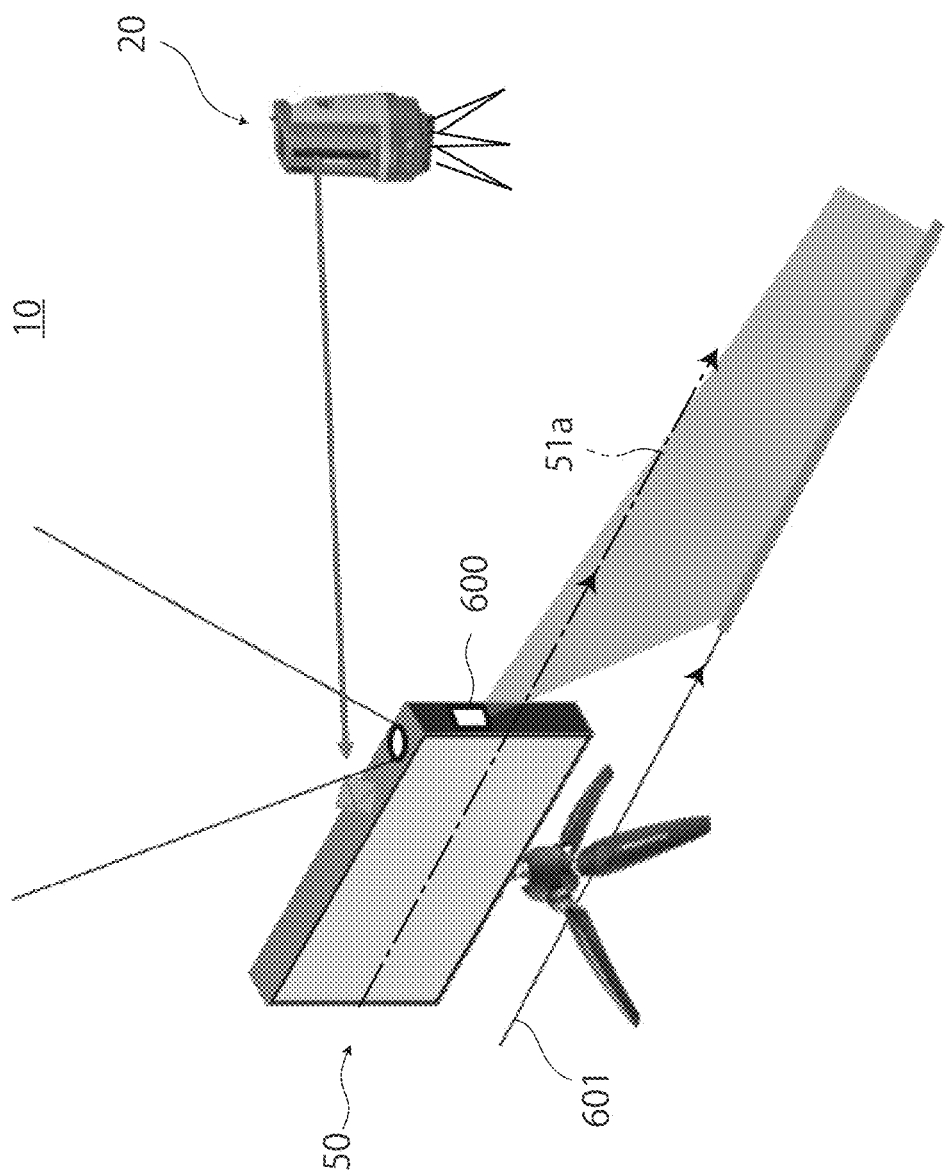
FIG. 16 is a configuration view of an information projecting system according to Modification 6 of the embodiment.

FIG. 16 is a configuration view of an information projecting system 10 according to Modification 6 of the embodiment. Modification 6 is a modification to be preferably applied to the first embodiment (including one reflector). At a construction site, a marking line 601 is drawn in many cases.

A projector device 50 of Modification 6 includes a line laser output unit 600 to use a marking line 601 for projector orientation information 83. An operator locates the projector device 50 so that a laser beam direction is along the marking line 601. The line laser output unit 600 is preferably provided on a surface so that a laser beam is output in the reference direction 51a (FIG. 1). Accordingly, the line laser output unit is located so that the laser beam matches the marking line 601, and the projector device orientation information 83 can be identified even though the reflector is one in number.

3-7. Modification 7

FIG. 17 is a configuration view of a projector device of an information projecting system 10 according to Modification 7 of the embodiment. Modification 7 is a modification to be preferably applied to the first embodiment (including one reflector). In Modification 7, the projector device 50 includes a reflector support body 700 between a housing 60 and a reflector 51, and the location of the reflector 51 is movable on the reflector support body 700. In a pattern 1, the reflector support body 700 is provided on a surface 60', and the reflector 51 is movable in a reference direction 51a by a slide rail, etc. In a pattern 2, the reflector support body 700 is provided so as to have an inclination on the surface 60', and the reflector 51 is movable by a slide rail, etc., in an inclined direction 51d that can be identified relative to the reference direction 51a. In a pattern 3, the reflector support body 700 is provided on the surface 60', and rotationally movable around a rotation axis 51e whose direction can be identified relative to the reference direction 51a. In any pattern, the positional relationship of the reflector support body 700 in the housing 60 can be identified by using the reference direction 51a, etc., so that housing positional relationship information 85 of the reflector 51 that moves on the reflector support body 700 can be identified. Accordingly, even though the reflector is one in number, projector orientation information 83 can be identified. In addition, the reflector 51 may be manually moved, or may be automatically moved by a mechanical mechanism.

Preferred embodiments of the present invention have been described above, and the embodiments are only examples of the present invention, and can be combined based on knowledge of a person skilled in the art, and such a combined embodiment is also included in the scope of the present invention.

REFERENCE SIGNS LIST

10 Information projecting system
11 Distance-measuring light
12 Tracking light
20 Measuring device
21 Inclination sensor
22 Communication unit
23 Storage unit
24 EDM light transmitting and receiving unit
25 Tracking light receiving unit
26 Tracking light transmitting unit
27 Arithmetic control unit
28 Horizontal angle detector
29 Vertical angle detector
30 Horizontal rotation driving unit
31 Vertical rotation driving unit
32 Display unit
33 Operation unit
35 Leveling unit
36 Base portion
37 Bracket portion
38 Telescope portion
50 Projector device
51 Reflector
511 First reflector
512 Second reflector
51a Reference direction
52 Projector
53 Inclination sensor
54 Communication unit
55 Storage unit
56 Arithmetic control unit
57 Projection optical axis
60 Housing
60' One surface of housing
61 Projection start point
70 Projection surface
71 Surface information
81 Distance information
82 Reflector coordinate information
83 Projector orientation information
84 Projector inclination information
85 Housing positional relationship information
100 Projection image generating unit
200 UAV
300 Autonomous running robot
500 Global camera
600 Line laser output unit
700 Reflector support body

The invention claimed is:

1. An information projecting system comprising:
a projector device including an inclination sensor, at least one reflector, and a housing, the inclination sensor configured to detect an angle of the housing with respect to gravity;
a measuring device including a telescope, an EDM light transmitting and receiving unit configured to emit distance-measuring light in a direction of a collimation optical axis of the telescope and receive reflected light of the distance-measuring light from the reflector, and an angle detector configured to detect a rotation angle of the telescope, the measuring device configured to measure a distance and angles to the reflector and measure a position of the reflector; and
a projection image generating unit including an electronic circuit configured to generate surface information, based on design data, to be projected onto a projection surface by the projector device, wherein
the projection image generating unit is configured to collect:
distance information as a distance between the projection surface and the measuring device in a normal direction;
reflector coordinate information of the reflector measured by the measuring device;
projector orientation information that is a reference direction set for the housing for detecting a projection optical axis direction of the projector device;
projector inclination information detected by the inclination sensor of the projector device; and
housing positional relationship information as a positional relationship between the reflector and a projection start point of the projection device on the housing,
wherein the projection image generating unit is configured to
identify the projector orientation information based on the measuring device,
identify the projection optical axis direction of the projector device from the projector orientation information and the projector inclination information,
identify a position of the projection start point, from the reflector coordinate information, the projector inclination information, and the housing positional relationship information, by offset observation from the reflector,
identify a projection distance from the projection start point of the projector device to the projection surface, from the distance information and the position of the projection start point, and
generate the surface information whose dimensions are matched with actual dimensions of the projection surface, from the projection distance and the projection optical axis direction to project the surface information,
wherein the projector device includes a reflector support body between the housing and the reflector, and the reflector is movable in location by the reflector support body, and the housing positional relationship information between the reflector and the projection start point is identified through the reflector support body.

2. The information projecting system according to claim 1, wherein the projector device includes two of the reflectors,
a first reflector and a second reflector are located with offsets provided in two orthogonal axis directions, the two orthogonal axes being grasped by the inclination sensor, with the offset in one axis direction, the projector orientation information is identified by using a direction of a line connecting the first reflector and the second reflector as a reference, and with the offset in the other axis direction, the first reflector and the second reflector are distinguished from each other.

3. The information projecting system according to claim 2, further comprising a tracking unit including a tracking light transmitting unit configured to emit tracking light and a tracking light receiving unit including an image sensor, and configured to identify a position of the tracking light from a difference between a landscape image including the tracking light reflected by the reflector and a landscape image excluding the tracking light to automatically track the first reflector and the second reflector, wherein after either one reflector is measured and the reflector coordinate information of a first one is acquired, either of four search start points and two search start points are calculated by (i) calculating a slope distance between the first reflector and the second reflector detected on the image sensor, the four search start points being separated diagonally by the slope distance or more from the reflector coordinate information of the first one, or (ii) calculating a height difference between the first reflector and the second reflector detected on the image sensor, the two search start points being separated upward and downward by a distance twice or more of the height difference from the reflector coordinate information of the first one, the tracking unit starts tracking in order from the search start points, and the reflector coordinate information of a second one as the other reflector is acquired.

4. The information projecting system according to claim 2, wherein the second reflector is supported by a columnar support body that is hollow as viewed from the one axis direction, and offset in the other axis direction with respect to the first reflector.

5. The information projecting system according to claim 1, wherein the projector device is mounted on an autonomously flying unmanned aircraft or an autonomous running robot.

6. The information projecting system according to claim 1, wherein the reflector is located on a head portion of a global camera located in the housing.

7. The information projecting system according to claim 1, wherein the projector device further includes a line laser configured to output a laser beam in the reference direction that is set for the housing for detecting the projector orientation information.

8. An information projecting method comprising the steps of:

by using a projector device including an inclination sensor configured to detect angle with respect to gravity, at least one reflector, and a housing, and a measuring device including a telescope, an EDM light transmitting and receiving unit configured to emit distance-measuring light in a direction of a collimation optical axis of the telescope and receive reflected light of the distance-measuring light from the reflector, and a angle detector configured to detect a rotation angle of the telescope, the measuring device configured to measure a distance and angles to the reflector and measure a position of the reflector, acquiring distance information as a distance between the projection surface and the measuring device in a normal direction;

acquiring projector orientation information that is a reference direction set for the housing for detecting a projection optical axis direction of the projector device;

acquiring reflector coordinate information of the reflector located on the projector device by the measuring device;

acquiring projector inclination information from the inclination sensor of the projector device;

collecting housing positional relationship information as a positional relationship between the reflector and a projection start point of the projection device on the housing, and identifying the projector orientation information based on the measuring device, identifying the projection optical axis direction of the projector device from the projector orientation information and the projector inclination information, identifying a position of the projection start point from the reflector coordinate information, the projector inclination information, and the housing positional relationship information by offset observation from the reflector, identifying a projection distance from the projection start point of the projector device to the projection surface from the distance information and the position of the projection start point, generating the surface information to have actual dimensions are matched with the actual dimension of the projection surface from the projection distance and the projection optical axis direction, and projecting the surface information onto the projection surface, wherein the projector device includes a reflector support body between the housing and the reflector, and the reflector is movable in location by the reflector support body, and the housing positional relationship information between the reflector and the projection starting point is identified through the reflector support body.

9. An information projecting system comprising:

a projector device including an inclination sensor, at least one reflector, and a housing, the inclination sensor configured to detect angle of the housing with respect to gravity;

a measuring device including a telescope, an EDM light transmitting and receiving unit configured to emit distance-measuring light in a direction of a collimation optical axis of the telescope and receive reflected light of the distance-measuring light from the reflector, and a angle detector configure to detect a rotation angle of the telescope, the measuring device configured to measure a distance and angles to the reflector and measure a position of the reflector; and a projection image generating unit including an electronic circuit configured to generate surface information, based on design data, to be projected onto a projection surface by the projector device, wherein the projection image generating unit is configured to collect:

distance information as a distance between the projection surface and the measuring device in a normal direction;

reflector coordinate information of the reflector measured by the measuring device;

projector orientation information that is a reference direction set for the housing for detecting a projection optical axis direction of the projector device;

projector inclination information detected by the inclination sensor of the projector device; and housing positional relationship information as a positional relationship between the reflector and a projection start point of the projection device on the housing, and project the surface information with actual dimensions on the projection surface, project the surface information by actual dimension onto the projection surface wherein the projection image generating unit is configured to identify the projection optical axis direction of the projector device from the projector orientation information and the projector inclination information, identify a position of the projection start point, from the reflector coordinate information, the projector inclination information, and the housing positional relationship information, by offset observation from the reflector, identify a projection distance from the projection start point of the projector device to the projection surface, from the distance information and the position of the projection start point, and generate the surface information to be with actual dimensions on the projection surface, from the projection distance and the projection optical axis direction to project the surface information, wherein the projector device includes two of the reflectors, a first reflector and a second reflector are located with offsets provided in two orthogonal axis directions, the two orthogonal axes being grasped by the inclination sensor, with the offset in one axis direction, the projector orientation information is identified by using a direction of a line connecting the first reflector and the second reflector as a reference, and with the offset in the other axis direction, the first reflector and the second reflector are distinguished from each other.

10. The information projecting system according to claim 9, further comprising a tracking unit including a tracking light transmitting unit configured to emit tracking light and a tracking light receiving unit including an image sensor, and configured to identify a position of the tracking light from a difference between a landscape image including the tracking light reflected by the reflector and a landscape image excluding the tracking light to automatically track the first reflector and the second reflector, wherein after either one reflector is measured and the reflector coordinate information of a first one is acquired, either of four search start points and two search start points are calculated by (i) calculating a slope distance between the first reflector and the second reflector detected on the image sensor, the four search start points being separated diagonally by the slope distance or more from the reflector coordinate information of the first one, or (ii) calculating a height difference between the first reflector and the second reflector detected on the image sensor, the two search start points being separated upward and downward by a distance twice or more of the height difference from the reflector coordinate information of the first one, the tracking unit starts tracking in order from the search start points, and the reflector coordinate information of a second one as the other reflector is acquired.

11. The information projecting system according to claim 10, wherein the second reflector is supported by a columnar support body that is hollow as viewed from the one axis direction, and offset in the other axis direction with respect to the first reflector.

12. An information projecting system comprising:

a projector device that projects a projection image from a projection start point along an optical axis, including an inclination sensor, at least one reflector, and a housing, the inclination sensor configured to detect an angle of the housing with respect to gravity;

a measuring device including a telescope, an EDM light transmitting and receiving unit configured to emit distance-measuring light in a direction of a collimation optical axis of the telescope and receive reflected light of the distance-measuring light from the reflector, and an angle detector configured to detect a rotation angle of the telescope, the measuring device configured to measure a distance and angles to the reflector and measure a position of the reflector; and a projection image generating unit including an electronic circuit configured to generate surface information, based on design data, to be projected onto a projection surface by the projector device, wherein the projection image generating unit is configured to generate dimensions of the projection surface and to generate a projection image whose actual dimensions match the dimensions of the projection surface without a distance sensor that measures a distance between the projection start point and the projection surface by collecting and processing:

distance information as a distance between the projection surface and the measuring device in a normal direction;

reflector coordinate information of reflector measured by the measuring device;

projector orientation information that is a reference direction set for the housing for detecting the projection optical axis direction of the projector device;

projector inclination information detected by the inclination sensor of the projector device; and housing positional relationship information as a positional relationship between the reflector and the projection start point of the projection device on the housing.

* * * * *